(12) United States Patent
Chiddick et al.

(10) Patent No.: US 8,307,786 B2
(45) Date of Patent: Nov. 13, 2012

(54) BIRD FEEDER PROTECTION APPARATUS AND METHODS

(76) Inventors: Kelvin Spencer Chiddick, Maple Ridge (CA); Donald Arthur Thomson, Abbotsford (CA)

( * ) Notice: Subject to any disclaimer, the term of this patent is extended or adjusted under 35 U.S.C. 154(b) by 86 days.

(21) Appl. No.: 13/016,831

(22) Filed: Jan. 28, 2011

(65) Prior Publication Data
US 2012/0192795 A1    Aug. 2, 2012

(51) Int. Cl.
*A01K 39/01* (2006.01)
(52) U.S. Cl. .................. 119/57.9; 119/429; 119/469
(58) Field of Classification Search ........... 119/51.01, 119/52.1, 52.2, 52.3, 57.8, 57.9, 58, 59, 63, 119/51.5, 61.1, 428, 429, 430, 431, 432, 119/433, 434, 435, 455, 456, 458, 459, 467, 119/469, 470, 472, 480, 461, 464, 468, 474, 119/473, 475; D30/121, 124, 119, 110, 120, D30/126
See application file for complete search history.

(56) References Cited

U.S. PATENT DOCUMENTS

| | | | |
|---|---|---|---|
| 1,468,730 A * | 9/1923 | Oster | ............................. 119/462 |
| 2,891,508 A | 6/1959 | Bower | |
| 2,931,336 A | 4/1960 | Cather | |
| 3,051,126 A | 4/1962 | Merritt et al. | |
| 3,086,499 A | 4/1963 | Dilley | |
| 3,090,354 A | 5/1963 | Merritt et al. | |
| 3,563,205 A * | 2/1971 | Vail | ............................... 119/429 |
| 3,792,685 A * | 2/1974 | Wiener | ......................... 119/432 |
| 4,389,975 A | 6/1983 | Fisher, Jr. | |
| 5,291,855 A | 3/1994 | Laverty | |
| 5,323,735 A | 6/1994 | Meng | |
| 5,361,723 A | 11/1994 | Burleigh | |
| 6,009,837 A * | 1/2000 | McClasky | ..................... 119/428 |
| 6,253,706 B1 | 7/2001 | Sloop | |
| 6,539,892 B1 | 4/2003 | Bescherer | |
| 6,543,384 B2 | 4/2003 | Cote | |
| RE38,182 E | 7/2003 | Nylen et al. | |
| 6,986,322 B2 | 1/2006 | Lumpkin | |
| 7,798,099 B2 | 9/2010 | Vosbikian | |
| 2007/0283894 A1 | 12/2007 | Bescherer | |

FOREIGN PATENT DOCUMENTS

| | | |
|---|---|---|
| CA | 2196225 A1 | 7/1998 |
| CA | 2349886 A1 | 12/2002 |
| GB | 2367230 A | 4/2002 |

* cited by examiner

*Primary Examiner* — T. Nguyen
(74) *Attorney, Agent, or Firm* — Oyen Wiggs Green & Mutala LLP

(57) ABSTRACT

Feeder protection apparatus comprising a plurality of side panels attached around a periphery of the base of the feeder by a plurality of fasteners. Each side panel comprises a generally rectangular sheet configured to be oriented generally perpendicular to the base when attached thereto and to extend above and below the base.

12 Claims, 6 Drawing Sheets

BIRD FEEDER PROTECTION APPARATUS AND METHODS

TECHNICAL FIELD

The invention relates to bird feeders. Particular embodiments provide apparatus and methods for protecting bird feeders from intrusion by unwanted invaders.

BACKGROUND

Many people set out feeders which contain seeds and other food items intended to attract various types of birds. However, a variety of other animals are often also attracted to such bird feeders, including rodents. Squirrels in particular can be surprisingly adept at accessing food contained in bird feeders, and are often able to circumvent measures taken in an attempt to protect feeders from intruders. Once a rodent has successfully obtained food from a feeder, the rodent is highly likely to return often in the search for more food. As a consequence, many residential complexes do not permit bird feeders on the premises since the attraction of rodents can create a nuisance for the residents.

There exist a variety of prior art solutions relating to preventing rodents or other invaders from accessing food in feeders. Examples include:
U.S. Pat. No. 7,798,099;
U.S. Pat. No. 6,986,322;
U.S. Pat. No. 6,543,384;
U.S. Pat. No. 6,253,706;
U.S. Pat. No. 5,361,723;
U.S. Pat. No. 5,323,735;
U.S. Pat. No. 5,291,855;
U.S. Pat. No. 4,389,975;
U.S. Pat. No. 3,090,354;
U.S. Pat. No. 3,086,499;
U.S. Pat. No. 3,051,126;
U.S. Pat. No. 2,931,336;
CA Patent No. 2349886;
CA Patent No. 2196225;
US Patent Application Publication No. 2007/0283894;
U.S. Pat. No. 6,539,892;
U.S. Pat. No. RE38182;
U.S. Pat. No. 2,891,508; and,
GB Patent No. 2367230.

The inventors have determined a need for improved apparatus and methods for protecting feeders from unwanted intruders.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect provides apparatus for protecting a feeder having a base, a body and a roof. The apparatus comprises a plurality of side panels attached around a periphery of the base of the feeder by a plurality of fasteners. Each side panel comprises a generally rectangular sheet configured to be oriented generally perpendicular to the base when attached thereto and to extend above and below the base.

One aspect provides a method for protecting a feeder comprising a base, a body and a roof. The method comprising attaching a plurality of side panels around a periphery of the base using a plurality of fasteners. Each side panel comprises a generally rectangular sheet configured to be oriented generally perpendicular to the base when attached thereto and to extend above and below the base.

One aspect provides a feeder protection kit comprising a plurality of side panel sheets for attaching around a periphery of a base of a feeder, a plurality of fasteners for attaching the side panel sheets to the base, and, instructions setting out steps for cutting the side panel sheets to lengths selected to match lengths of corresponding sides of the base, positioning the side panel sheets to be oriented generally perpendicular to the base and to extend above and below the base.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
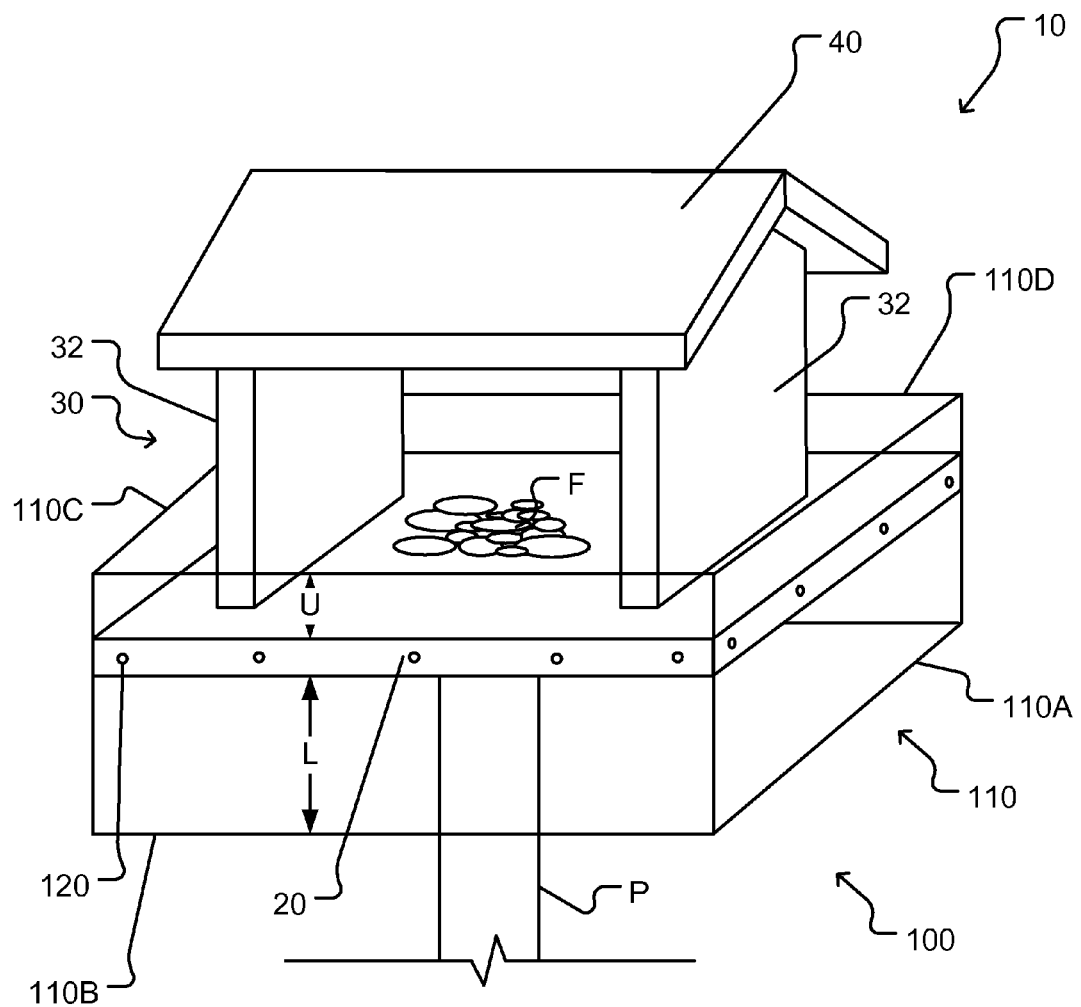
FIG. 1 shows a pole mounted bird feeder with protection apparatus according to one embodiment.

FIG. 1 shows a bird feeder 10 with protection apparatus 100 installed thereon according to one embodiment. Feeder 10 comprises a base 20, a body 30 and a roof 40, which cooperate to define a feed area F where seeds and other food items may be placed and sheltered from the elements. In the illustrated embodiment feeder 10 is mounted on pole P. Feeder 10 may, for example, be constructed in whole or in part from wood.

In the illustrated embodiment body 30 simply comprises a pair of opposed walls 32, but other configurations of body 30 are also possible. For example, either or both of walls 32 may have a bird access opening (not shown) defined therein. In some embodiments, walls 32 could have a pair of angled plates (not shown) extending therebetween to define a feed storage area, with the angled plates positioned to be relatively close together at the bottom thereof and leaving a gap between the plates and base 20, such that as feed is removed from feed area F further feed is allowed to fall out of the feed storage area between the angled plates, as known in the art. In some embodiments, walls 32 may be located at the edges of base 20 and portions of protection apparatus 100 may also be attached to walls 32 for increased structural integrity, as described below with reference to FIG. 3. Those skilled in the art will appreciate that many variations in the configuration of feeder 10 are possible.

Protection apparatus 100 comprises a plurality of panels 110 secured about the periphery of base 20 by fasteners 120. Panels 110 are oriented generally perpendicular to base 20, such that panels 110 are vertical when base 20 is horizontal. In the illustrated embodiment, base 20 is rectangular, and apparatus 100 comprises four panels 110 (individually labeled 110A, 110B, 110C and 110D), but it is to be understood that base 20 could have different shapes, and the number of panels 110 may be selected to match the number of sides of base 20.

In the illustrated embodiment, each side of base 20 is generally straight, and each panel 110 is secured to one side of base 20 using a plurality of fasteners 120. In some embodiments, fasteners 120 may be spaced approximately every three inches along the length of each panel 110. Fasteners 120 may, for example, comprise screws. In some embodiments, base 20 may not have straight sides, in which case panels 110 may be flexed to conform to the shape of the sides of base 20 and a greater number of fasteners 120 may be used to maintain each panel 110 substantially flush against the corresponding side of base 20. In some embodiments, fasteners 120 may be omitted from a portion of one of panels 110 and that portion of that panel 110 may instead be secured by a hand-operable fastener received in a slot defined in panel 110, as described below with reference to FIG. 3.

Each panel 110 is generally rectangular in shape, having a length selected to match a length of the side of base 20 to which it is secured. Panels 110 are configured to extend above base 20 by an upper distance U and below base 20 by a lower distance L. Extension of panels 110 below base 20 prevents intruders from accessing feed area F from the bottom, for example by climbing up pole P or jumping toward base 20. Extension of panels 110 above base 20 increases the height which an intruder must jump in order to access feed area F, and also prevents wastage of feed falling off base 20 for example by birds kicking the feed around. In some embodiments, upper distance U is selected to leave at least three inches between the top of panels 110 and the bottom edges of roof 20. In some embodiments, upper distance U is at least two inches. In some embodiments, lower distance L is at least three inches. In some embodiments, both upper distance U and lower distance L may be about three inches.

Panels 110 are preferably constructed from a material which is substantially impenetrable to the claws of would-be intruders such that intruders can not climb panels 110. In some embodiments, panels 110 are constructed from a transparent material so as to avoid interfering with the viewing of birds in feeder 10. In some embodiments, panels 110 are constructed from a material which may be cleanly cut with ordinary scissors without leaving a sharp edge. In some embodiments, panels 110 are constructed from an impact resistant, flexible material. In some embodiments, panels 110 are constructed from a food safe material. In some embodiments, panels 110 are constructed from a material which is relatively temperature insensitive. Panels 110 may, for example, be constructed from a polymer-based material such as glycol-modified polyethylene terephthalate (PETG). In some embodiments each panels 110 comprises a sheet of PETG having a thickness of about 0.040".

Panels 110 may be cut to lengths to match the lengths of the sides of base 20, and attached to base 20 using fasteners 120 such as, for example screws. In some embodiments panels 110 may be screwed onto base 20 without first drilling holes in panels 110 or base 20.

Figure 2:
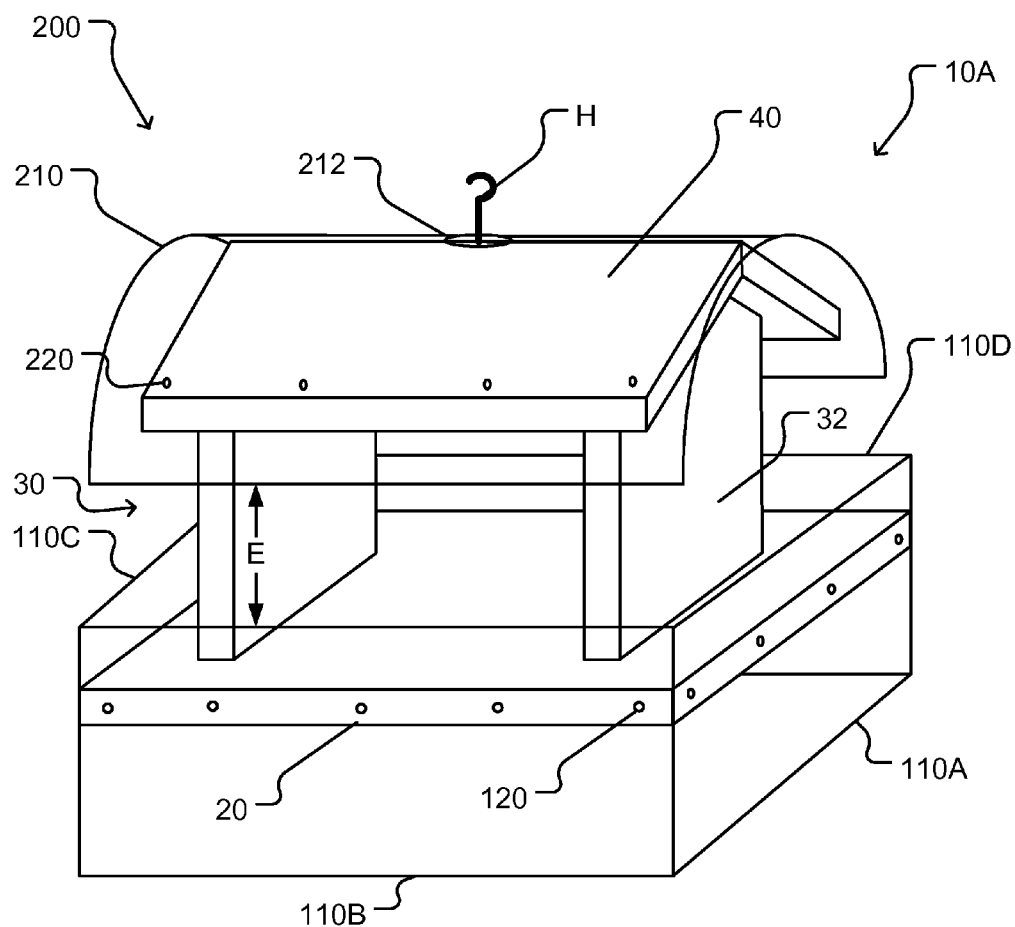
FIG. 2 shows a hanging bird feeder with protection apparatus according to another embodiment.

FIG. 2 shows feeder 10A with protection apparatus 200 installed thereon according to one embodiment. Feeder 10A substantially similar to feeder 10 of FIG. 1, except that feeder 10A is mounted by means of a hanger H coupled to a supporting structure (not shown). Apparatus 200 comprises panels 110 attached to base 20 with fasteners 120 as described above, and additionally comprises a roof cover 210. Roof cover 210 may be formed from the same material as panels 110. Roof cover 210 prevents intruders from accessing feed area F from above, for example by climbing down from roof 40. Roof cover 210 is configured to leave an entrance distance E between the lowermost portions thereof and the uppers edges of panels 110. In some embodiments, entrance distance E is at least three inches.

Figure 2A:
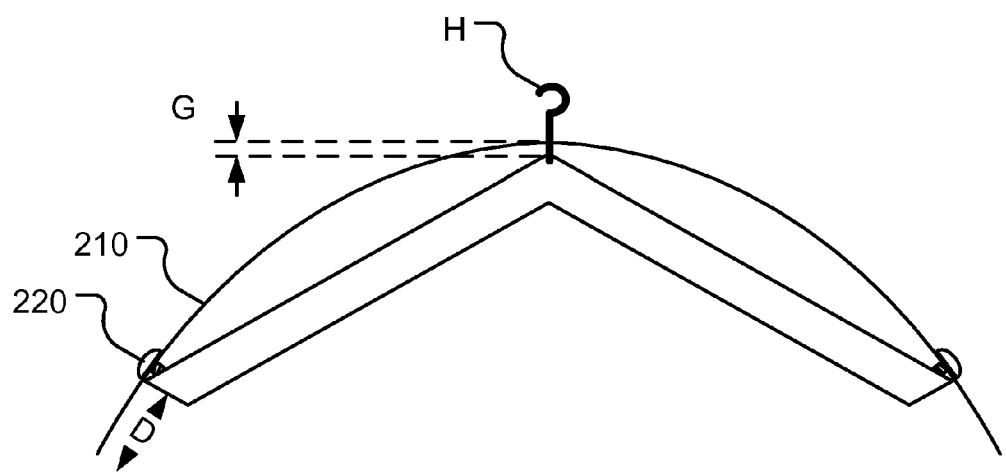
FIG. 2A is an end view showing the roof and roof skirt of the FIG. 2 embodiment in isolation.
Figure 2B:
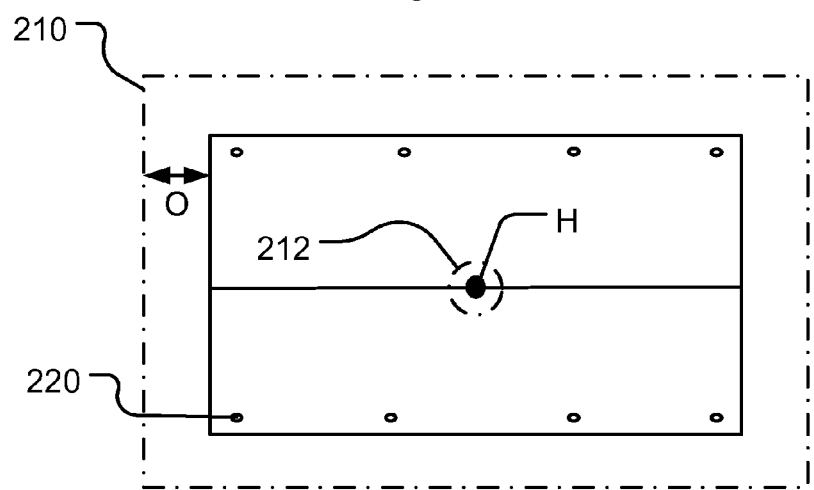
FIG. 2B is a top view of the roof and roof skirt of the FIG. 2 embodiment.

Roof panel 210 has an opening 212 therein positioned to allow hanger H to pass therethrough. In some embodiments, roof panel 210 may be attached to a pole-mounted feeder, in which case opening 212 may be omitted. Roof panel 210 is attached to roof 40 with fasteners 220. Fasteners 220 may, for example, comprise screws. Roof panel 210 is preferably flexible such that it may be bent over the crest of roof 40 and attached with fasteners 220 positioned near the edges of roof 40. As best seen in FIG. 2A, there may be an optional gap G between roof panel 210 and the crest of roof 40. Gap G may be about one half to one inch in some embodiments. Gap G, when present, provides instability to roof panel 210 such that if a squirrel or other invader manages to get atop roof panel 210, the invader will not have a stable footing from which to attempt to access feed area F. Gap G may also provide for greater ventilation to prevent mold and/or algal growth under roof panel 210 and facilitate drying of a wooden roof 40. Roof panel 210 may extend a distance D past the edges of roof. Distance D may be about 1 to 3 inches in some embodiments. As best seen in FIG. 2B, roof skirt may be sized so as to extend horizontally outwardly beyond the edges of roof 40 by an overhang distance O. Overhang distance O may be at least about 1 to 3 inches in some embodiments.

Figure 3:
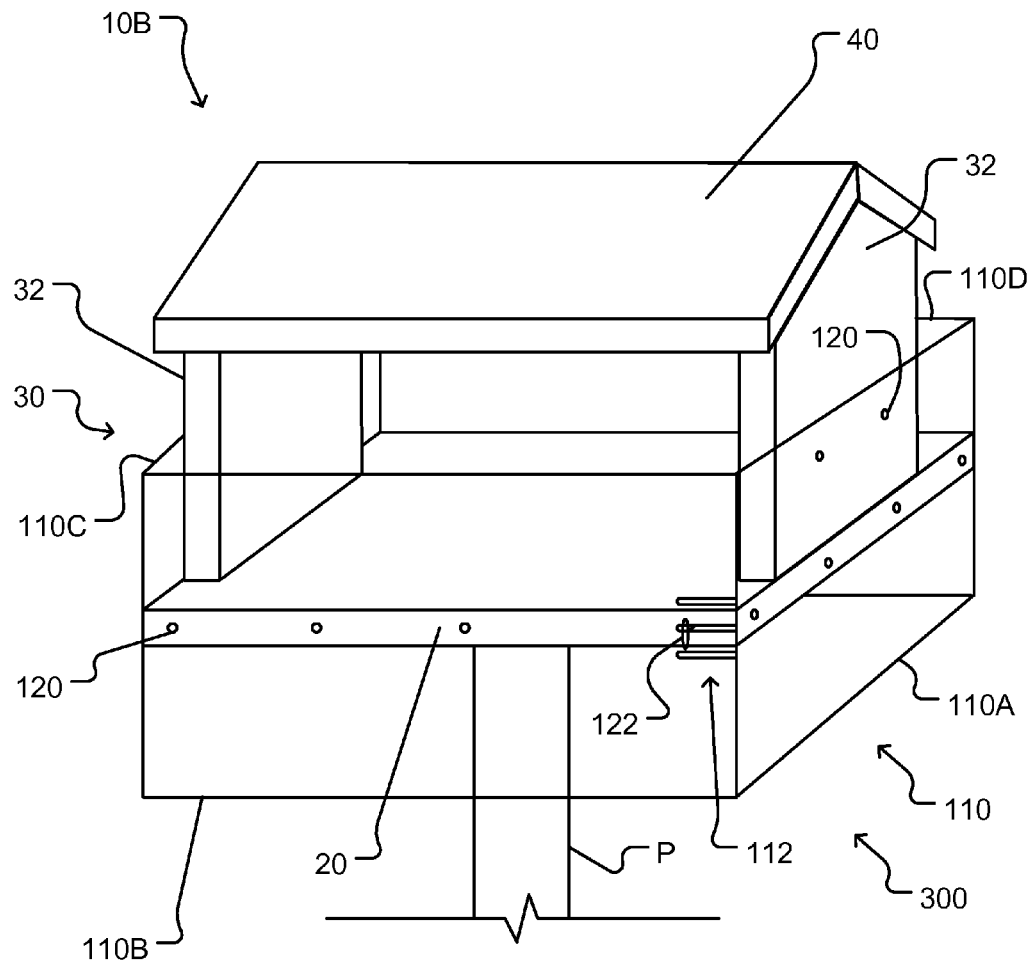
FIG. 3 shows a pole mounted bird feeder with protection apparatus according to another embodiment.

FIG. 3 shows feeder 10B with protection apparatus 300 installed thereon according to one embodiment. Feeder 10B substantially similar to feeder 10 of FIG. 1, except that walls 32 of feeder 10B are positioned at the edges of base 20. Apparatus 300 comprises panels 110 attached to base 20 with fasteners 120 as described above, with panels 110A and 110C also attached to walls 32 with additional fasteners 120. Attaching panels 110 to walls 32 in addition to base 20 may provide increased structural integrity to protection apparatus 300. Apparatus 300 also differs from apparatus 100 of FIG. 1 in that one of panels 110 of apparatus 300 (panel 100B in the illustrated embodiment) has a plurality of slots 112 defined at one end thereof. Panels 110 are positioned such that one of slots 112 is located at the height of base 20. In the illustrated embodiment, three slots 112 are provided to allow the user flexibility in selecting the height of panels 110 with respect to base 20, but it is to be understood that only one or two slots may be provided in some embodiments, or additional slots may be provided.

For the portion of panel 110B near slots 112, instead of fasteners 120 a hand-operable fastener is provided. The hand-operable fastener has a head portion which is elongated in one direction, and which may readily be rotated by a user to be aligned with one of slots 112 to allow the head portion to pass therethrough to permit a portion of panel 110B to be bent away from base 20 for cleaning feeder 10B, as described below with reference to FIGS. 3A and 3B. In the illustrated embodiment, the hand-operable fastener comprises a threaded eyelet 122, but it is to be understood that the hand-operable fastener could comprise other elements having a head portion which is elongated in one direction.

Figure 3A:
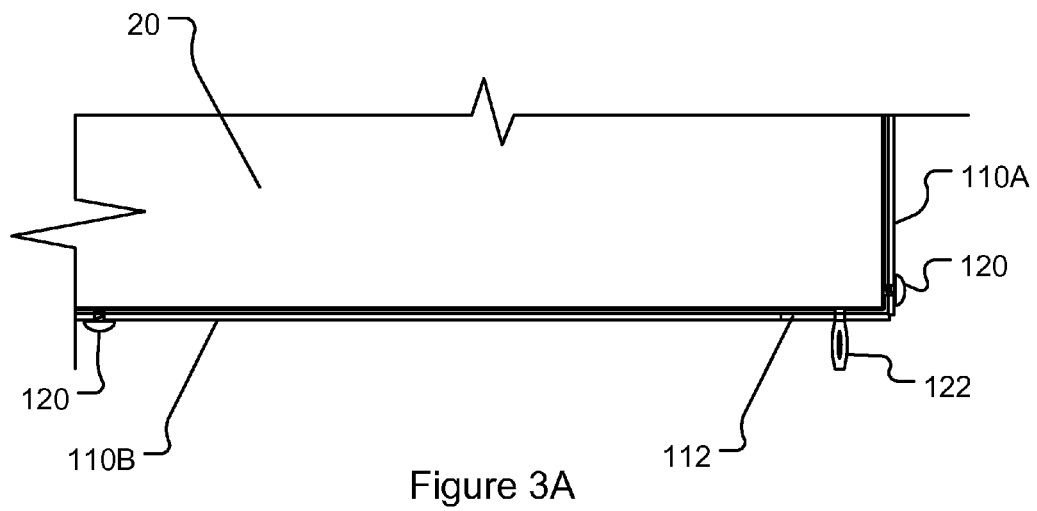
FIG. 3A shows a top view of a portion of the base and two side panels of the FIG. 3 embodiment.
Figure 3B:
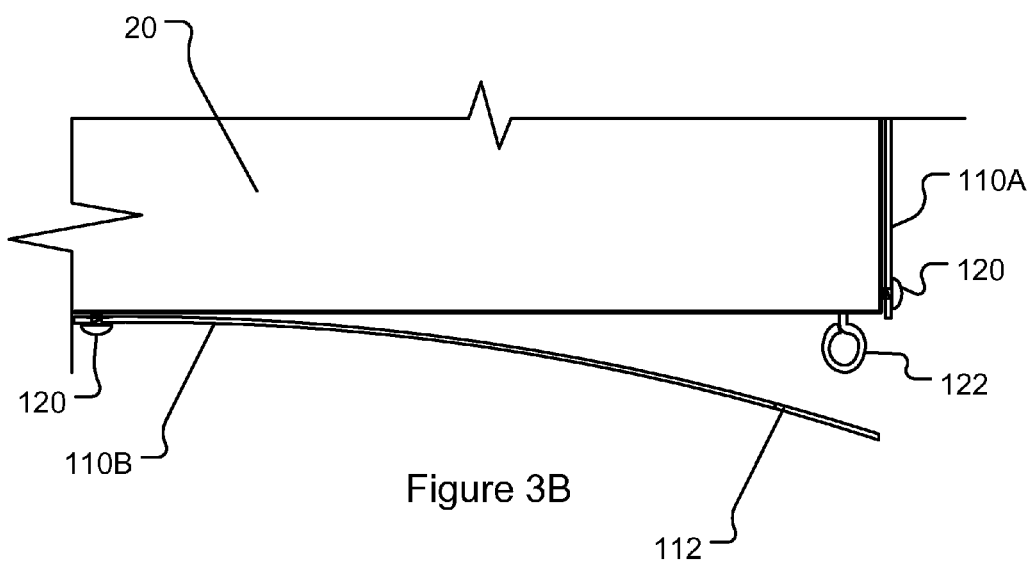
FIG. 3B shows the same view as FIG. 3A with one of the side panels in a flexed position for cleaning the feeder.

FIG. 3A shows eyelet 122 with its head portion out of alignment with slot 112. In this configuration, the head portion of eyelet 122 bears against portions of panel 110B adjacent to slot 122 to hold the end of panel 110B against the edge of base 20. FIG. 3B shows eyelet 122 with its head portion aligned with slot 112. In this configuration, the end of panel 110B may be pulled away from the edge of base 20, such that a user may sweep any debris on base 20 out of the feeder through the gap between the flexed end of panel 110B and base 20.

One skilled in the art will appreciate that the embodiments of FIGS. 1 to 3 include various features which may be used in various combinations other than those illustrated. For example, roof panel 210 of FIG. 2 may be used with feeder 10 of FIG. 1 or feeder 10B of FIG. 3. Similarly, one or more slots such as slots 112 of FIG. 3 may be provided in any of panels 110 of FIG. 1 or 2, and/or walls 32 of either of feeder 10 of FIG. 1 or feeder 10A of FIG. 2 may be positioned at edges of base 20 such that panels 110 may be attached thereto.

Figure 4:
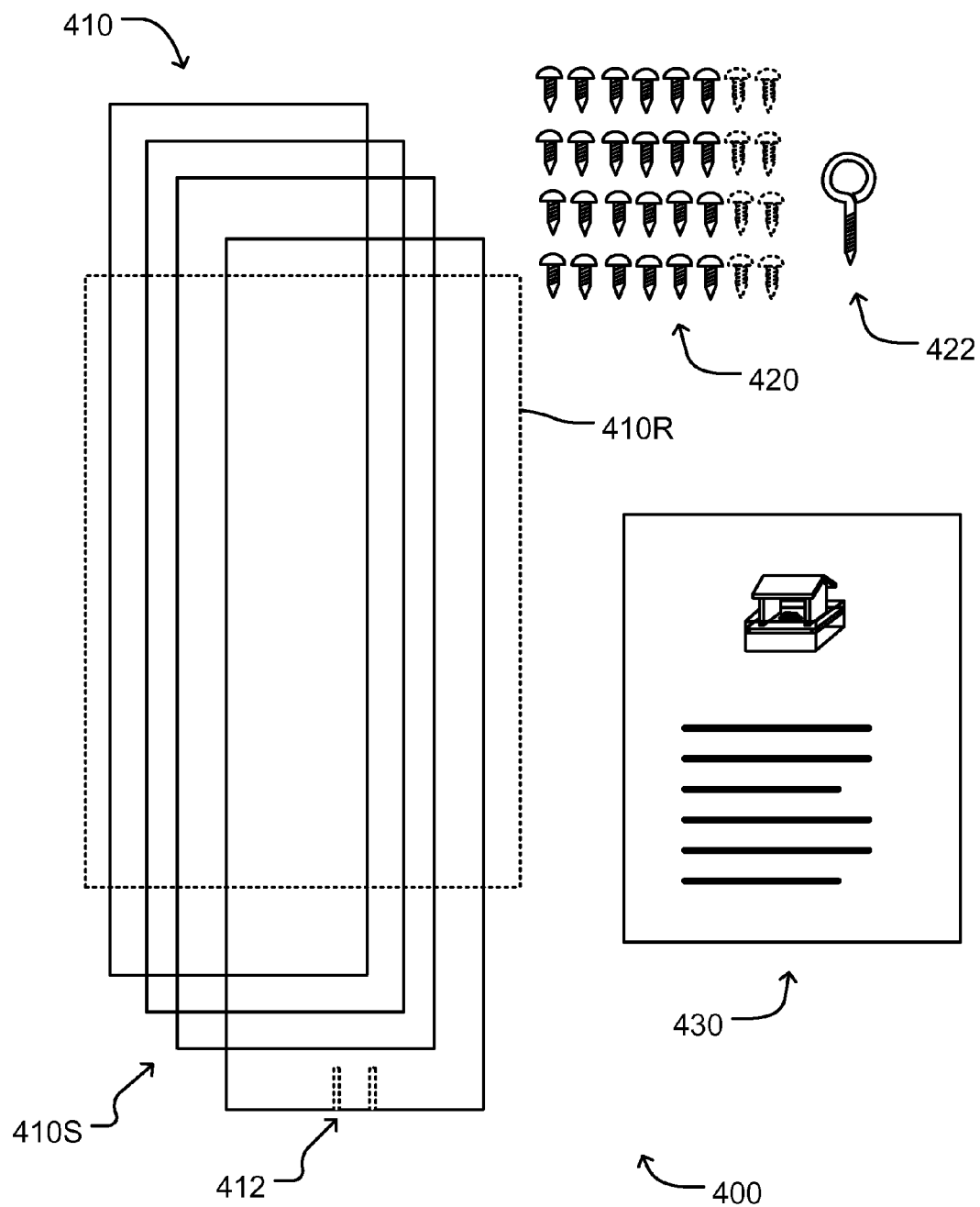
FIG. 4 shows a feeder protection kit according to one embodiment.

FIG. 4 shows a feeder protection kit 400 according to one embodiment. Kit 400 comprises a plurality of transparent plastic sheets 410, a plurality of fasteners 420, and instructions 430. Sheets 410 comprise a plurality of side panel sheets 410S for attaching around the base of a feeder. Instructions 430 set out a series of steps for installing kit 400, including cutting side panel sheets 410S to match the lengths of the sides of a feeder base and screwing side panel sheets 410S onto the edged of the base. In some embodiments, four side panel sheets 410S may be provided. Sheets 410 may also include a roof panel sheet 410R for attaching to the roof of a feeder, in which case instructions 430 may also set out steps for installing roof panel sheet 410R, including optionally cutting roof panel sheet 410R to a desired size based on the dimensions of the feeder roof, flexing roof panel sheet 410R over the top of the roof and screwing roof panel sheet to the edges of the roof. In some embodiments, one of side panel sheets 410S may have one or more slots 412 defined in an end thereof, and kit 400 may include a threaded eyelet 422, in which case instructions 430 may also set out steps for positioning a slot 412 and operating eyelet 422, as discussed above with respect to FIGS. 3, 3A and 3B.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. Apparatus for protecting a feeder having a base, a body and a roof, the apparatus comprising a plurality of side panels attached around a periphery of the base of the feeder by a plurality of fasteners, each side panel comprising a generally rectangular sheet configured to be oriented generally perpendicular to the base when attached thereto and to extend above and below the base, wherein at least one of the side panels has one or more slots defined at an end thereof, the apparatus further comprising a hand-operable fastener for attaching the end of the side panel by inserting through the one or more slots to the base, wherein the hand-operable fastener comprises a head portion elongated in one direction.

2. Apparatus according to claim 1 wherein each side panel is configured to extend at least three inches below the base.

3. Apparatus according to claim 2 wherein each side panel is configured to extend at least two inches above the base.

4. Apparatus according to claim 1 wherein each side panel comprises a substantially transparent flexible plastic sheet.

5. Apparatus according to claim 1 wherein each side panel is constructed from PETG.

6. Apparatus according to claim 5 wherein the PETG has a thickness of approximately 0.040".

7. Apparatus according to claim 1 wherein the fasteners comprise screws for inserting through the side panels and into the base.

8. Apparatus according to claim 1 comprising a roof panel attached to the roof, the roof panel comprising a substantially transparent flexible plastic sheet bent over a crest of the roof and attached to edges of the roof with a plurality of fasteners.

9. Apparatus according to claim 8 wherein the roof panel is constructed from PETG having a thickness of approximately 0.040".

10. Apparatus according to claim 8 wherein the roof panel has an opening defined therein positioned to allow a hanger for handing the feeder to pass therethrough.

11. Apparatus according to claim 8 wherein the roof panel extends horizontally outwardly beyond edges of the roof by at least about one to three inches.

12. Apparatus according to claim 1 wherein the body of the feeder comprises at least one wall located at an edge of the base, and wherein one of the side panels is additionally attached to the wall located at the edge of the base by one or more additional fasteners.

* * * * *